United States Patent
Kalentics et al.

(10) Patent No.: US 12,447,557 B2
(45) Date of Patent: Oct. 21, 2025

(54) LASER TREATMENT SYSTEMS AND METHODS FOR IN-SITU LASER SHOCK PEENING (LSP) TREATMENT OF PARTS DURING PRODUCTION THEREOF BY A SELECTIVE LASER SINTERING OR MELTING (SLS/SLM) PROCESS, AND ADDITIVE MANUFACTURING SYSTEMS AND METHODS IMPLEMENTING THE SAME

(71) Applicant: Ecole Polytechnique Federale de Lausanne (EPFL), Lausanne (CH)

(72) Inventors: Nikola Kalentics, Lausanne (CH); Roland Logé, Lausanne (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 629 days.

(21) Appl. No.: 17/774,226

(22) PCT Filed: Nov. 4, 2019

(86) PCT No.: PCT/IB2019/059448
§ 371 (c)(1),
(2) Date: May 4, 2022

(87) PCT Pub. No.: WO2021/090043
PCT Pub. Date: May 14, 2021

(65) Prior Publication Data
US 2022/0395906 A1     Dec. 15, 2022

(51) Int. Cl.
*B22F 10/28* (2021.01)
*B22F 10/00* (2021.01)
(Continued)

(52) U.S. Cl.
CPC ............ *B23K 26/342* (2015.10); *B22F 10/00* (2021.01); *B22F 10/28* (2021.01); *B22F 10/32* (2021.01);
(Continued)

(58) Field of Classification Search
CPC .... B23K 26/356; B23K 31/003; B23K 26/16; B23K 26/342; B23K 26/127;
(Continued)

(56) References Cited

U.S. PATENT DOCUMENTS 3,850,698 A * 11/1974 Mallozzi .............. C21D 10/005
148/525
4,938,816 A * 7/1990 Beaman .................... B22F 7/02
264/435

(Continued)

FOREIGN PATENT DOCUMENTS

| | | |
|---|---|---|
| CN | 207301487 U | 5/2018 |
| CN | 108500261 A | 9/2018 |

(Continued)

OTHER PUBLICATIONS

International Search Report; European Patent Office; International Application No. PCT/IB2019/059448; Jul. 22, 2020; 7 pages.
(Continued)

*Primary Examiner* — Eric S Stapleton
(74) *Attorney, Agent, or Firm* — Taft Stettinius & Hollister LLP

(57) ABSTRACT

A laser treatment system and method for imparting beneficial residual stresses into a desired part during production thereof by a Selective Laser Sintering or Melting (SLS/SLM) process, the method including repeatedly subjecting the part to an in-situ Laser Shock Peening (LSP) treatment during the SLS/SLM process. The in-situ LSP treatment includes selectively bringing an LSP module in contact with
(Continued)

a surface of the part during the SLS/SLM process, and subjecting the LSP module to the action of a first laser beam to impart beneficial residual stresses into the part. The LSP module is movable between a building chamber where the part is being produced for the purpose of carrying out the in-situ LSP treatment, and a separate storage chamber when the LSP module is not used for the purpose of carrying out the in-situ LSP treatment. The invention is also implementable in a corresponding additive manufacturing system and method.

22 Claims, 9 Drawing Sheets

(51) Int. Cl.
| | |
|---|---|
| B22F 10/32 | (2021.01) |
| B22F 10/50 | (2021.01) |
| B22F 10/73 | (2021.01) |
| B22F 12/00 | (2021.01) |
| B22F 12/41 | (2021.01) |
| B22F 12/70 | (2021.01) |
| B23K 26/16 | (2006.01) |
| B23K 26/342 | (2014.01) |
| B23K 26/356 | (2014.01) |
| B23K 26/70 | (2014.01) |
| B33Y 10/00 | (2015.01) |
| B33Y 30/00 | (2015.01) |
| B33Y 40/20 | (2020.01) |
| C21D 10/00 | (2006.01) |
| B22F 10/60 | (2021.01) |

(52) U.S. Cl.
CPC .............. *B22F 10/50* (2021.01); *B22F 10/73* (2021.01); *B22F 12/22* (2021.01); *B22F 12/41* (2021.01); *B22F 12/70* (2021.01); *B23K 26/16* (2013.01); *B23K 26/356* (2015.10); *B23K 26/706* (2015.10); *B33Y 10/00* (2014.12); *B33Y 30/00* (2014.12); *B33Y 40/20* (2020.01); *C21D 10/005* (2013.01); *B22F 10/60* (2021.01); *B22F 2201/02* (2013.01); *B22F 2201/11* (2013.01)

(58) Field of Classification Search
CPC .. B23K 26/706; B23K 26/0622; B33Y 40/20; B33Y 40/00; B33Y 30/00; B33Y 10/00; B22F 12/41; B22F 12/22; B22F 10/00; B22F 10/50; B22F 12/70; B22F 10/28; B22F 10/73; B22F 10/32; B22F 2201/11; B22F 2201/02; B22F 10/60; B22F 2003/248; B22F 2003/247; B22F 2998/10; B22F 3/24; B22F 2999/00; C21D 10/005; Y02P 10/25
USPC ...................................................... 219/121.84
See application file for complete search history.

(56) References Cited

U.S. PATENT DOCUMENTS

| | | | |
|---|---|---|---|
| 5,155,324 A * | 10/1992 | Deckard | B29C 41/46 |
| | | | 219/121.64 |
| 7,868,268 B1 * | 1/2011 | Tenaglia | B23K 26/18 |
| | | | 148/508 |
| 2017/0087670 A1 * | 3/2017 | Kalentics | B22F 10/50 |
| 2020/0189037 A1 * | 6/2020 | Lu | B22F 12/60 |

FOREIGN PATENT DOCUMENTS

| | | |
|---|---|---|
| EP | 3147048 A1 | 3/2017 |
| JP | 2019094546 A | 6/2019 |
| WO | 2018196106 A1 | 11/2018 |

OTHER PUBLICATIONS

Written Opinion of the International Searching Authority; European Patent Office; International Application No. PCT/IB2019/059448; Jul. 22, 2020; 11 pages.

* cited by examiner

LASER TREATMENT SYSTEMS AND METHODS FOR IN-SITU LASER SHOCK PEENING (LSP) TREATMENT OF PARTS DURING PRODUCTION THEREOF BY A SELECTIVE LASER SINTERING OR MELTING (SLS/SLM) PROCESS, AND ADDITIVE MANUFACTURING SYSTEMS AND METHODS IMPLEMENTING THE SAME

CROSS REFERENCE TO RELATED APPLICATIONS

This application is a U.S. national stage filing of International Patent Application No. PCT/IB2019/059448 filed Nov. 4, 2019, the contents of which are hereby incorporated by reference in their entirety.

TECHNICAL FIELD

The present invention generally relates to Selective Laser Sintering or Melting (SLS/SLM) and more precisely to systems and method for laser treatment by an in-situ Laser Shock Peening (LSP) treatment of parts produced by a SLS/SLM process, which in-situ LSP treatment is implemented in particular to impart beneficial residual stresses (namely compressive residual stresses) into the solidified material during the SLS/SLM process. The invention also relates to additive manufacturing systems and methods embodying the aforementioned laser treatment systems and methods.

BACKGROUND OF THE INVENTION

Additive Manufacturing (AM) currently revolutionizes the way parts are being made with the ability to produce lightweight parts with geometries of unprecedented complexities. One of the most widely used and researched AM processes is Selective Laser Melting (SLM), also known as Direct Metal Laser Sintering (DMLS), Laser Cusing or Selective Laser Sintering (SLS).

The expressions "Selective Laser Sintering" and "Selective Laser Melting" and the acronyms thereof, SLS/SLM, will be used in the context of the present invention to indiscriminately refer to such AM processes which, in essence, make use of a laser to fuse or melt metallic, ceramic or polymer powders together to produce a solidified part, irrespective of whether the powder particles are partly or fully melted under the action of the laser.

Prior art examples of such processes are for instance disclosed in U.S. Pat. Nos. 5,155,324 A and 4,938,816 A, the contents of which are incorporated herein by reference in their entirety.

Many further developments have been made in the field of SLS/SLM technology, mostly in relation to improvements in e.g. the accuracy of the powder deposition system, scanning optics, preheating of the substrate, and control of the chamber atmosphere.

FIG. 1 schematically illustrates a standard SLS/SLM system 1 and related additive manufacturing method as known in the art. At each step of the process a fresh powder layer is deposited by a suitable powder deposition system 13 over the surface of a powder bed 15 in which a desired part P is gradually produced by selectively treating portions of each powder layer to cause local fusing or melting of the powder particles. To this end, a laser beam L produced by a suitable laser unit 11 is guided over the desired portions of the surface S of the powder bed 15 to be treated by means of a suitable laser guiding system, such as a scanning head arrangement 12. After rapid solidification of the fused or molten powder, the material gets consolidated and a platform 16 located below the powder bed 15 is lowered by an amount corresponding to a desired layer thickness. Another fresh powder layer is then deposited by the powder deposition system 13 over the surface S of the powder bed 15 and the process is repeated until completion of the desired part P. At the end of the process, all unused powder is removed and can be recycled in a subsequent manufacturing process.

Although mechanical properties of parts made by SLS/SLM technology have come close to those made by conventional manufacturing techniques, there are still some limitations inherent to this additive manufacturing process. These are mainly the accumulation of detrimental tensile residual stresses (TRS), which cause a decreased fatigue life of produced parts, geometrical distortion, or even cracking and delamination during the building phase and failure of the process. These limitations require extensive post-processing steps, which can be expensive and time consuming, and cannot always appropriately address the issues, such as process failure due to cracking and part delamination.

A hybrid solution that combines the SLS/SLM process with an in-situ Laser Shock Peening (LSP) treatment has therefore been proposed and in particular forms the subject-matter of European Patent Publication No. EP 3 147 048 A1 and corresponding US Patent Publication No. US 2017/0087670 A1 in the name of the present Applicant, the content of which publications is incorporated herein by reference in its entirety. According to this solution, a so-called hybrid 3D LSP (SLS/SLM+LSP) process is carried out in which the desired part is subjected to an in-situ laser treatment, namely an in-situ LSP treatment, during SLS/SLM production of the desired part. This in-situ LSP treatment may be a warm LSP treatment (or WLSP), i.e. an LSP treatment that is carried out at elevated temperatures. In effect, the SLS/SLM process is repeatedly interrupted during production of the desired part, and the desired part is subjected to a Laser Shock Peening treatment before resuming the SLS/SLM process. This in-situ LSP treatment involves the use of a dedicated LSP module that is brought into position to contact the relevant surface of the desired part to be treated, which LSP module is used in conjunction with a dedicated laser unit producing a laser beam (or LSP laser) that is selected to carry out the in-situ LSP treatment to impart beneficial residual stresses (namely compressive residual stresses, or CRS) to the desired part being produced, thereby preventing accumulation of detrimental tensile residual stresses, improving fatigue life, and reducing geometrical distortion as well as cracking and part delamination issues. In essence, benefits of the in-situ LSP treatment and the imparting of beneficial residual stresses that results therefrom include increase of the hardness of the material, grain refinement, reduction in geometrical distortion, crack density decrease, increase in fatigue life, improvement of corrosion and wear resistance, etc.

Laser Shock Peening (LSP) per se, also referred to as conventional LSP or 2D LSP, is a known post-process used to introduce compressive residual stresses into parts. The conventional LSP process is explained in greater detail in e.g. U.S. Pat. Nos. 3,850,698 A and 7,868,268 B1, the contents of which publications are likewise incorporated herein by reference in their entirety. Conventional LSP typically involves the use of a high energy laser beam operated in pulsed mode, which beam is focused on selected portions of the surface of the part to be treated. Prior to the laser treatment, the relevant surface of the part is typically covered with an ablative layer (or coating) that is opaque to the LSP laser and that is accordingly ablated during the LSP treatment while forming plasma on the surface of the part. The purpose of the ablative layer is to prevent melting and ablating of the surface of the part per se and preserve a high surface quality. A confining medium or overlay transparent to the LSP laser (usually water) is further placed over the ablative layer. The LSP laser is typically pulsed with a pulse duration in the nanosecond range to vaporize the ablative layer and create plasma at the interface between the confining medium and the surface of the part which continues to absorb the laser energy for the whole duration of the laser pulse. The hydrodynamic expansion of the heated plasma in the confined region between the surface of the part and the confining medium creates a high-amplitude, short-duration shock wave. The shock wave pressure is in the magnitude of GPa, which can therefore be much larger than the dynamic yield strength of the material of the part being treated. Once the peak pressure exceeds this threshold, the shock wave induces plastic deformation and compressive residual stresses, thereby modifying near-surface microstructure and mechanical properties of the part. Due to the high strain rates (typically around $10^6$ s$^{-1}$), the LSP process can have an effect on grain size and is linked to enhanced material properties and increased hardness at the surface and in the subsurface. LSP induces beneficial compressive residual stresses which can reach a depth of several millimetres and positively influence fatigue life, wear and corrosion resistance.

Warm Laser Shock Peening (WLSP), also referred to as Thermally engineered LSP, is an LSP process in which the treated part is kept at elevated temperatures, usually between 200° C. and 350° C., during the LSP treatment. Depending on the material to be treated, such a WLSP process can lead to further improvements in the mechanical properties of the treated part.

FIGS. 2a and 2b schematically illustrate a hybrid 3D LSP (SLS/SLM+LSP) system 1' and related method as described in US Patent Publication No. US 2017/0087670 A1 mentioned above. The same reference numerals are used in FIGS. 2a and 2b as in FIG. 1 with regard to relevant components 11-13, 15, 16 of the SLS/SLM system 1' that have already been described with reference to FIG. 1, which components fulfil essentially the same purposes. One will therefore mainly focus on the relevant additional components forming the laser treatment system 10 used for the purpose of carrying out the in-situ LSP treatment, which laser treatment systems 10 includes in particular a laser unit 21 configured to produce a laser beam $L_{LSP}$ selected to carry out the in-situ LSP treatment on the desired part P and a displaceable LSP module 20 operable in conjunction with the laser unit 21 and configured to be selectively brought, during the in-situ LSP treatment, in contact with the surface S of the powder bed 15 and the part P being gradually produced therein.

FIG. 2a shows the LSP module 20 in its working position, brought into contact with the surface S of the powder bed 15 and the part P being produced therein. FIG. 2b shows the LSP module 20 in a retracted position, away from the surface S of the powder bed 15.

After a certain number of layers have been made by the SLS/SLM system 1' in a continuous mode (in a manner similar to what has already been described with reference to FIG. 1), the LSP module 20 is placed above and in contact with the surface S of the powder bed 15 (as schematically shown in FIG. 2a) and the in-situ LSP treatment is carried out using the LSP laser beam $L_{LSP}$. Since the use of water as confining medium is not practical in this instance, as water would contaminate the powder bed and interfere with the SLS/SLM process, a solid multi-layered confinement medium is used instead, which takes the form of a confining window 22 transparent to the LSP laser beam $L_{LSP}$ and associated confining material 25. The confining window 22 may be a rigid, relatively thick structure conforming to the shape of the relevant surface S to be treated, namely a planar structure in the illustrated example. The consumable confining material 25 is positioned and guided between the confining window 22 and the surface S of the powder bed 15. This consumable confining material 25 may be provided in the form of rolls, the consumable confining material 25 being unwound from a supply roll 251 and rewound, after use, onto a recovery roll 252. The consumable confining material 25 is designed to protect the bottom surface of the confining window 22 from debris of the LSP treatment as well as from dust and powder particles. The consumable confining material 25 can be a multi-layered material (with two or more layers) in which the top layer 25a is transparent to the LSP laser beam $L_{LSP}$ (which top layer 25a acts as consumable confining layer) and the bottom layer 25b is selected to interact with the LSP laser beam $L_{LSP}$ (which bottom layer 25b acts as consumable ablative layer). After the in-situ LSP treatment of selected portions of the surface S of the part P has been completed and the LSP module 20 has been retracted away from the surface S, a fresh portion of consumable confining material 25 is unwound from the supply roll 251 to be brought under the confining window 22 and the waste portion of consumable confining material 25 is wound onto the recovery roll 252, which operation can be carried out by a suitable actuator 255 associated e.g. to the recovery roll 252. The aforementioned SLS/SLM process and LSP treatment are carried out in this way, in an interleaved manner, until the part P is completed.

In effect, the repeated performance of LSP treatments as discussed above, during the gradual production of the desired part, may be assimilated to a three-dimensional LSP (3D LSP) treatment as beneficial compressive residual stresses are imparted to the desired part during the production thereof, rather than as a post-processing operation. This 3D LSP approach thus favours accumulation of beneficial CRS beneath the top surface of the part, while conventional LSP cannot yield such results. This being said, an LSP post-process, following completion of the desired part, may still be beneficial in that orientation of the part during the SLS/SLM process also impacts the distribution of detrimental tensile residual stresses on the surface of the completed part. Carrying out an LSP post-process on the critical zones and side surfaces of a completed part typically requires another, dedicated post-processing machine which can be very expensive, especially due to the price of the LSP laser unit. Quite often, such LSP post-processing machines are not readily available in the workshops of most companies, which implies that LSP post-processing of the final parts is typically outsourced.

A limitation of the 3D LSP approach discussed hereabove with reference to FIGS. 2a and 2b resides in the fact that the LSP module 20, and especially the confining window 22, may be contaminated by residues of the SLS/SLM process and/or LSP treatment, be it by powder particles or dust created as a result of the SLS/SLM process and/or LSP treatment. In particular, during the SLS/SLM process, excessive fumes may be created which, although being adequately removed and filtered, may partly contaminate the building chamber and the LSP module 20 located therein. In addition, during the powder deposition step, powder particles may be scattered around the building chamber and may especially land on the top surface of the confining window 22, which could be detrimental to the in-situ LSP treatment. Although the consumable confining material protects the bottom surface of the confining window 22 from these process residues, accumulation of such residues on the top surface of the confining window 22 may cause scattering of the LSP laser beam during the in-situ LSP treatment, potentially damaging the top surface of the confining window 22.

There is therefore a need for an improved solution.

SUMMARY OF THE INVENTION

A general aim of the invention is to remedy the above-noted shortcomings of the prior art solutions.

More precisely, an aim of the present invention is to provide a laser treatment system and method of imparting beneficial residual stresses into a desired part during production thereof by a SLS/SLM process, which involves an in-situ LSP treatment of the part by means of an LSP module with improved and enhanced protection against process residues.

A further aim of the invention is to provide such a solution that is robust and cost-efficient to implement.

Yet another aim of the invention is to provide such a solution that does not negatively impact production of the part and can be implemented in a reasonably simple manner.

An aim of the invention is also to provide such a solution that further allows a more optimal integration of the LSP post-process of a produced part, be it a part obtained following completion of the SLS/SLM process or any other produced part, including a part produced by conventional means.

These aims are achieved thanks to the solutions defined in the claims.

In accordance with a first aspect of the invention, there is accordingly provided a laser treatment system, namely a laser treatment system configured in particular to impart beneficial residual stresses into a desired part during production thereof by a Selective Laser Sintering or Melting (SLS/SLM) process, the laser treatment system comprising:

a powder bed configured to receive powder particles and in which the desired part can be gradually produced, layer after layer, in accordance with the SLS/SLM process;

a first laser unit configured to produce a first laser beam that is selected to carry out an in-situ Laser Shock Peening (LSP) treatment on the desired part as the desired part is gradually being produced in the powder bed;

an LSP module operable in conjunction with the first laser unit and configured to be selectively brought, during the in-situ LSP treatment, in contact with a surface of the powder bed; and a laser guiding system configured to guide the first laser beam during the in-situ LSP treatment, over selected portions of the surface of the powder bed to impart beneficial residual stresses into the desired part upon being subjected to the action of the first laser beam.

According to this first aspect of the invention, the powder bed is located in a building chamber and in that the LSP module is configured to be selectively brought into the building chamber for the purpose of carrying out the in-situ LSP treatment and to be temporarily stored, when not used for the purpose of carrying out the in-situ LSP treatment, into a separate storage chamber located adjacent to the building chamber.

Preferred and advantageous embodiments of this first aspect of the invention are disclosed herein.

In accordance with a second aspect of the invention, there is further provided a laser treatment system, namely a laser treatment system configured in particular to impart beneficial residual stresses into a desired part during production thereof by a Selective Laser Sintering or Melting (SLS/SLM) process, the laser treatment system comprising:

a powder bed configured to receive powder particles and in which the desired part can be gradually produced, layer after layer, in accordance with the SLS/SLM process;

first laser unit configured to produce a first laser beam that is selected to carry out an in-situ Laser Shock Peening (LSP) treatment on the desired part as the desired part is gradually being produced in the powder bed;

an LSP module operable in conjunction with the first laser unit and configured to be selectively brought, during the in-situ LSP treatment, in contact with a surface of the powder bed; and a laser guiding system configured to guide the first laser beam during the in-situ LSP treatment, over selected portions of the surface of the powder bed to impart beneficial residual stresses into the desired part upon being subjected to the action of the first laser beam, wherein the LSP module includes:

a confining window transparent to the first laser beam; and consumable confining material which is positioned and guided between the confining window and the surface of the powder bed, the consumable confining material including a consumable confining layer transparent to the first laser beam.

According to this second aspect of the invention, the consumable confining material is positioned and guided in such a way that the consumable confining layer surrounds the confining window on top and bottom surfaces thereof and protects the confining window from contamination by process residues.

Preferred and advantageous embodiments of this second aspect of the invention are disclosed herein.

In accordance with a third aspect of the invention, there is further provided a laser treatment system, namely a laser treatment system configured in particular to impart beneficial residual stresses into a desired part during production thereof by a Selective Laser Sintering or Melting (SLS/SLM) process, the laser treatment system comprising:

a powder bed configured to receive powder particles and in which the desired part can be gradually produced, layer after layer, in accordance with the SLS/SLM process;

first laser unit configured to produce a first laser beam that is selected to carry out an in-situ Laser Shock Peening (LSP) treatment on the desired part as the desired part is gradually being produced in the powder bed;

an LSP module operable in conjunction with the first laser unit and configured to be selectively brought, during the in-situ LSP treatment, in contact with a surface of the powder bed; and a laser guiding system configured to guide the first laser beam during the in-situ LSP treatment, over selected portions of the surface of the powder bed to impart beneficial residual stresses into the desired part upon being subjected to the action of the first laser beam.

According to this third aspect of the invention, the LSP module is configured, at least temporarily, to be at least partially located within a stream of gas produced by an associated protective gas flow arrangement when not used for the purpose of carrying out the in-situ LSP treatment.

Preferred and advantageous embodiments of this third aspect of the invention are disclosed herein, it being to be appreciated that this third aspect of the invention is advantageously implementable in combination with the first or second aspect mentioned above.

In accordance with a fourth aspect of the invention, there is further provided a laser treatment system, namely a laser treatment system configured in particular to impart beneficial residual stresses into a desired part during production thereof by a Selective Laser Sintering or Melting (SLS/SLM) process, the laser treatment system comprising:

a powder bed configured to receive powder particles and in which the desired part can be gradually produced, layer after layer, in accordance with the SLS/SLM process;

a first laser unit configured to produce a first laser beam that is selected to carry out an in-situ Laser Shock Peening (LSP) treatment on the desired part as the desired part is gradually being produced in the powder bed;

an LSP module operable in conjunction with the first laser unit and configured to be selectively brought, during the in-situ LSP treatment, in contact with a surface of the powder bed; and a laser guiding system configured to guide the first laser beam during the in-situ LSP treatment, over selected portions of the surface of the powder bed to impart beneficial residual stresses into the desired part upon being subjected to the action of the first laser beam.

According to this fourth aspect of the invention, the laser treatment system further comprises a fan and/or mechanical elements, such as brush elements, to remove process residues from the LSP module.

Preferred and advantageous embodiments of this fourth aspect of the invention are disclosed herein.

Also disclosed is an additive manufacturing system for production of a desired part by a Selective Laser Sintering or Melting (SLS/SLM) process, the additive manufacturing system comprising a laser treatment system in accordance with any one of the aforementioned first to fourth aspects of the invention acting as in-situ laser treatment system during the SLS/SLM process, the additive manufacturing system further comprising:

a movable platform located below the powder bed and configured to be gradually lowered as the desired part is being gradually produced in the powder bed;

a second laser unit configured to produce a second laser beam that is selected to interact with the powder particles contained in the powder bed to carry out the SLS/SLM process; and a powder deposition system configured to deposit a fresh layer of powder particles over the surface of the powder bed prior to treatment with the second laser beam.

Preferred and advantageous embodiments of this additive manufacturing system are disclosed herein.

A fifth aspect of the invention is an additive manufacturing system for production of a desired part by a Selective Laser Sintering or Melting (SLS/SLM) process, the additive manufacturing system comprising an in-situ laser treatment system configured in particular to impart beneficial residual stresses into the desired part during production thereof by the SLS/SLM process, the in-situ laser treatment system comprising:

a powder bed configured to receive powder particles and in which the desired part can be gradually produced, layer after layer, in accordance with the SLS/SLM process;

a first laser unit configured to produce a first laser beam that is selected to carry out a Laser Shock Peening process on the desired part as the desired part is gradually being produced in the powder bed;

an LSP module operable in conjunction with the first laser unit and configured to be selectively brought, during the in-situ LSP treatment, in contact with a surface of the powder bed; and a laser guiding system configured to guide the first laser beam, during the in-situ LSP treatment, over selected portions of the surface of the powder bed to impart beneficial residual stresses into the desired part upon being subjected to the action of the first laser beam.

According to this fifth aspect of the invention, the additive manufacturing system comprises a beam splitter configured to direct the first laser beam to the laser guiding system during the in-situ LSP treatment and/or to a secondary laser treatment system configured to perform an in-line post-treatment of a produced part, which secondary laser treatment system is configured to subject the produced part to an LSP post-treatment, or in-line LSP post-process.

Preferred and advantageous embodiments of this fifth aspect of the invention are disclosed herein, it being to be appreciated that this fifth aspect of the invention is advantageously implementable in combination with any one of the first to fourth aspects mentioned above.

Also disclosed herein are laser treatment methods in accordance with the first to fourth aspects of the invention, as well as additive manufacturing methods in accordance with the first to fifth aspects of the invention.

These aspects and others of the invention are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

The present invention will be described in relation to various illustrative embodiments as illustrated in particular by FIGS. 3 to 8. It shall be understood that the scope of the invention encompasses all combinations and sub-combinations of the features of the embodiments disclosed herein.

As described herein, when two or more parts or components are described as being connected, attached, secured or coupled to one another, they can be so connected, attached, secured or coupled directly to each other or through one or more intermediary parts.

Figure 1:
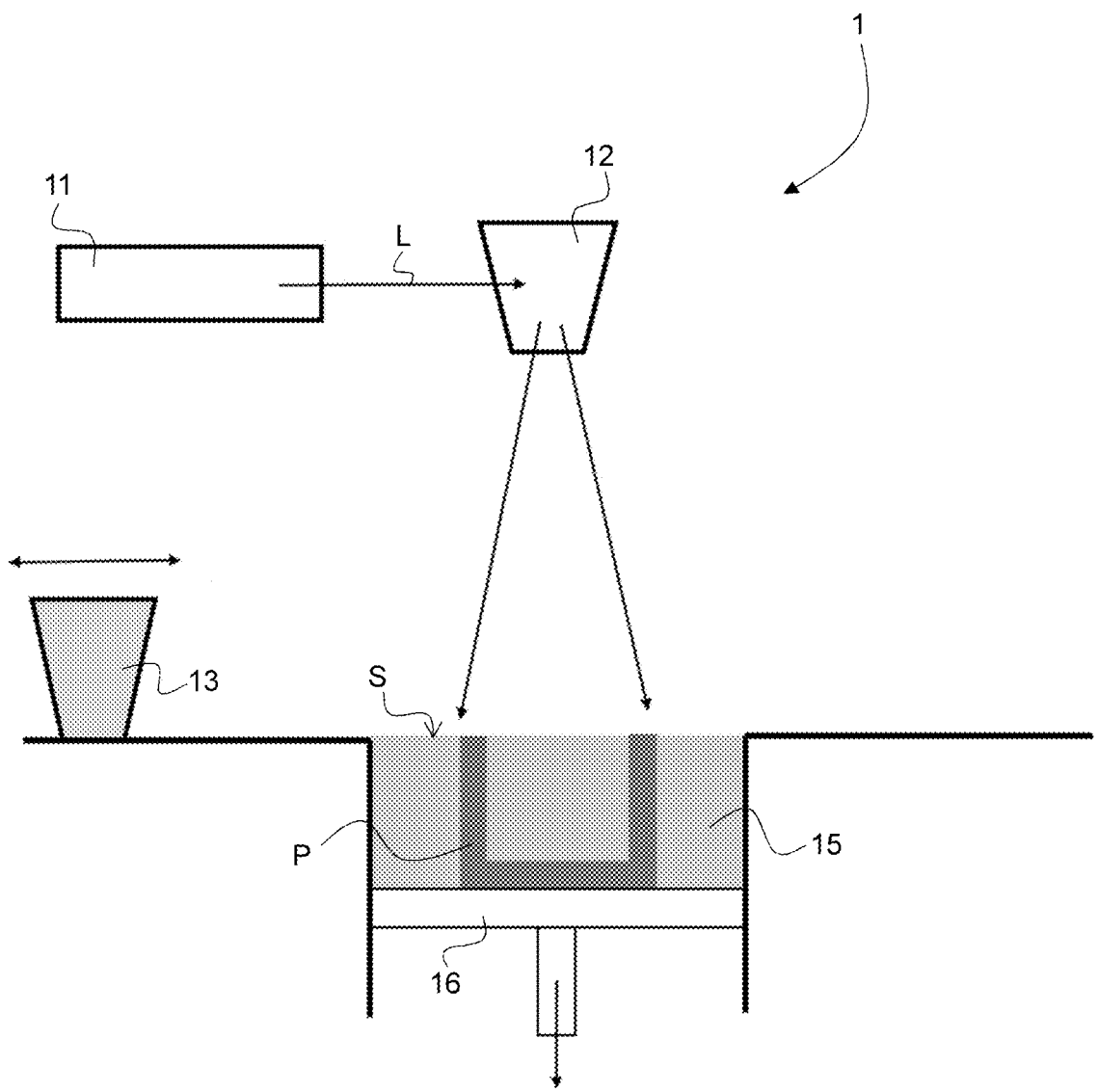
FIG. 1 is a schematic illustration of a conventional SLS/SLM system for the additive manufacturing of parts.
Figure 2A:
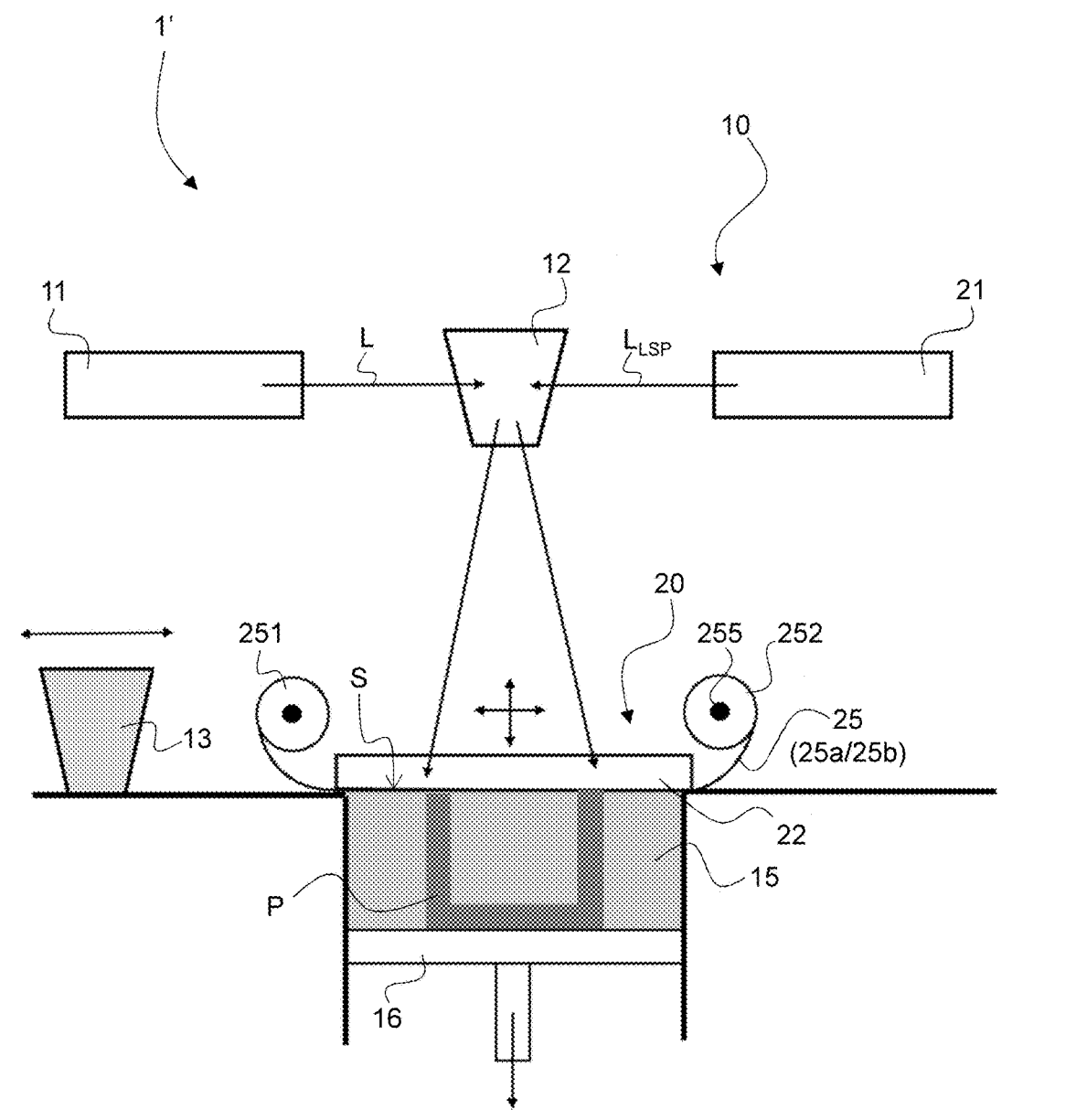
FIGS. 2a and 2b are schematic illustrations of a so-called hybrid 3D LSP (SLS/SLM+LSP) system as taught in US Patent Publication No. US 2017/0087670 A1
Figure 2B:
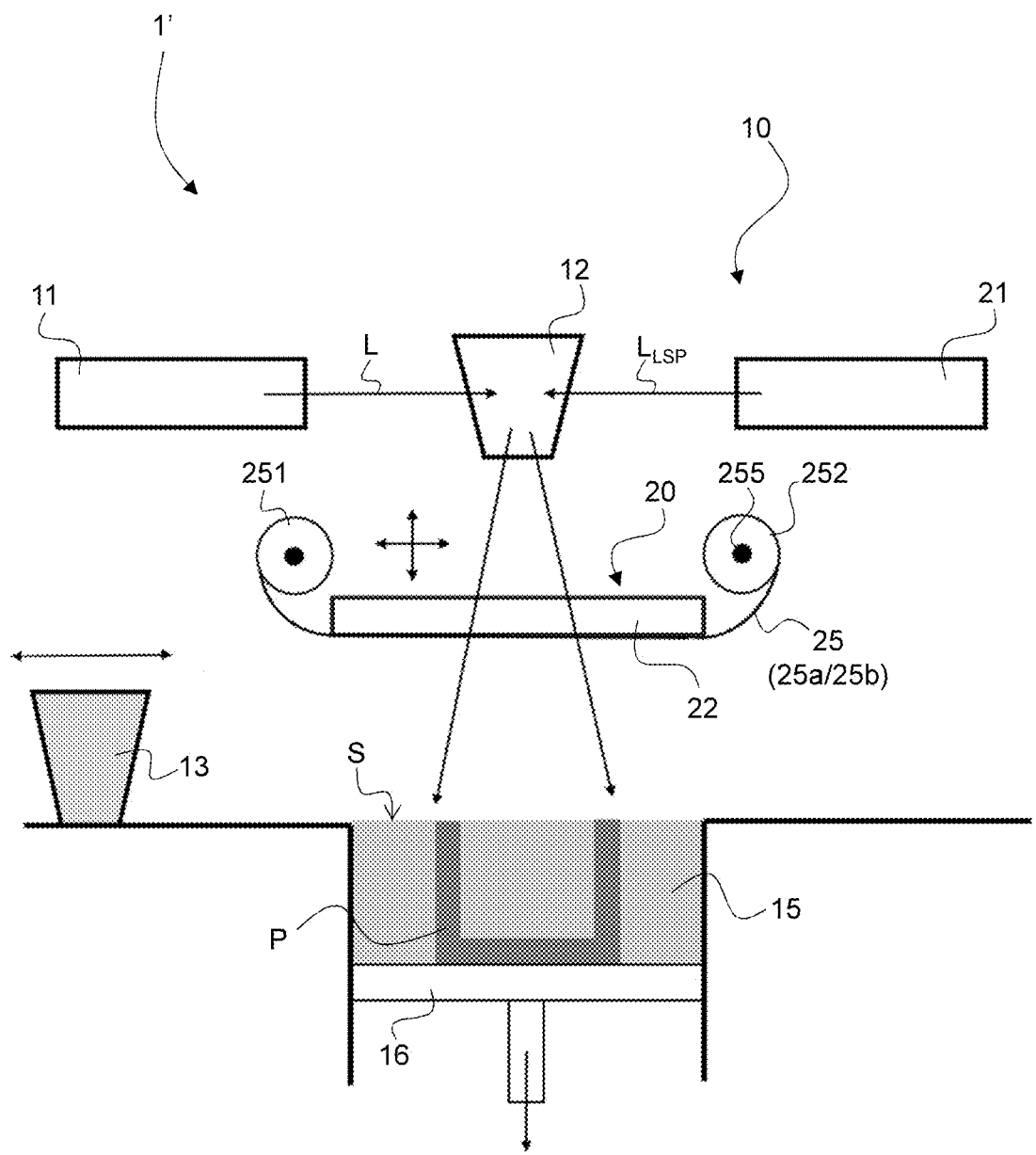
Figure 3:
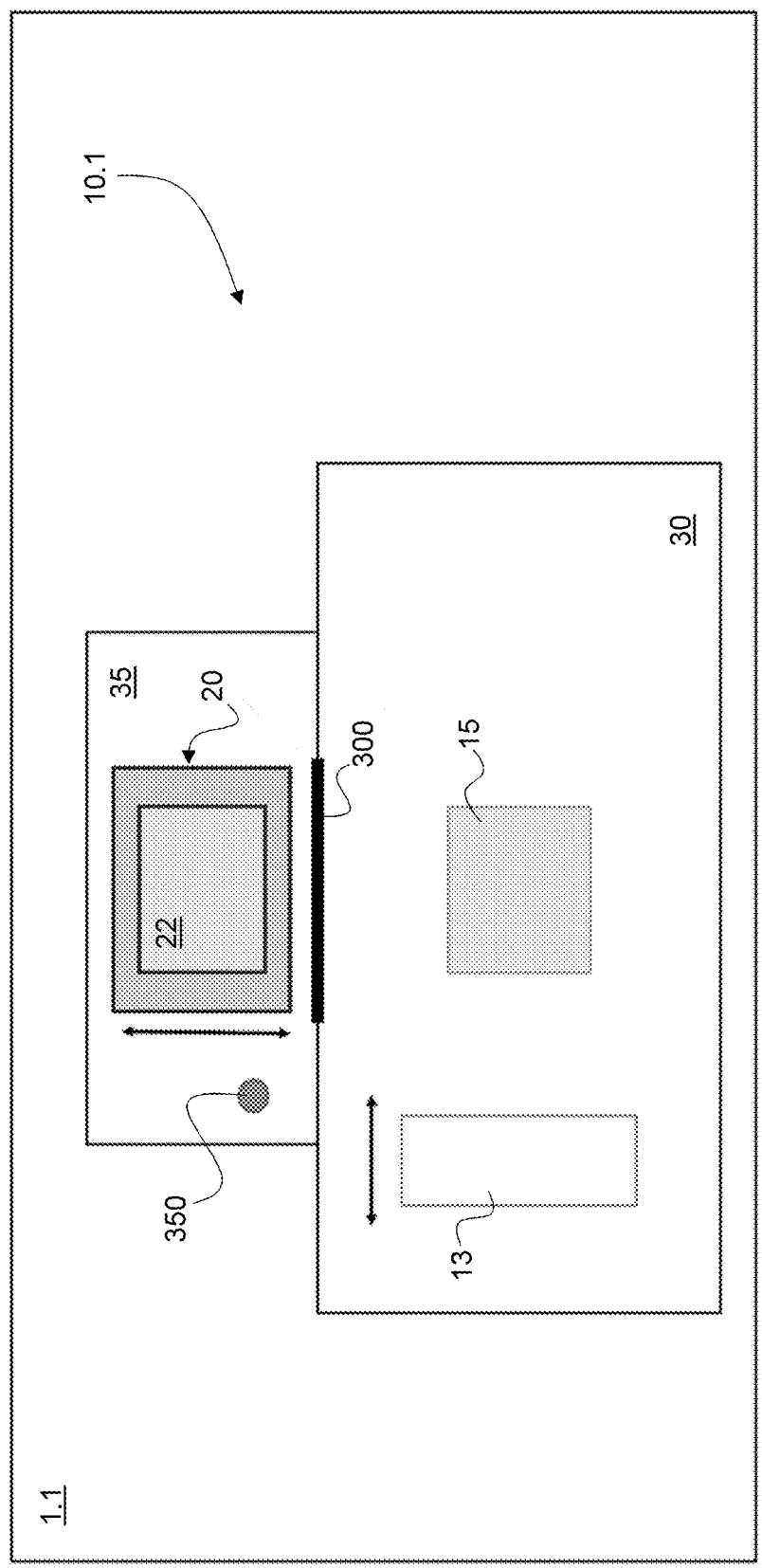
FIG. 3 is a schematic top view of a first embodiment of a hybrid SLS/SLM system including an in-situ LSP treatment system in accordance with the first aspect of the invention.

FIG. 3 is a schematic top view of a first embodiment of a hybrid SLS/SLM system, designated globally by reference 1.1, including an in-situ LSP treatment system 10.1 in accordance with the first aspect of the invention. Some components of the SLS/SLM system 1.1 used for the purpose of carrying out layer-by-layer production of the desired part (not shown in FIG. 3) are not specifically illustrated in FIG. 3, but it should be appreciated that such components would typically be provided. Shown in FIG. 3 are the powder bed 15 configured to receive powder particles in which a desired part (not shown) can be gradually produced, layer after layer, in accordance with the typical SLS/SLM process, and an associated powder deposition system 13 configured to deposit a fresh layer of powder particles over the surface of the powder bed 15 prior to each SLS/SLM step. The powder bed 15 and powder deposition system 13 are here shown located within a same building chamber 30. The laser unit configured to produce the relevant SLS/SLM laser beam and associated laser guiding system are not specifically shown in FIG. 3, but such additional components would typically be provided and would operate in essentially the same manner as discussed in connection with the laser unit 11 and laser guiding system 12 shown in FIG. 1 and FIGS. 2a-b.

The in-situ LSP treatment system 10.1 is used to carry out an in-situ Laser Shock Peening (LSP) treatment on the desired part being produced during the SLS/SLM process in a manner similar to the approach described with reference to FIGS. 2a and 2b, however in a different manner. In this case, the in-situ LSP treatment system 10.1 includes an LSP module 20 that is operable in conjunction with an associated laser unit (not shown in FIG. 3) configured to produce a (pulsed) laser beam selected to carry out the in-situ LSP treatment. While this is not specifically shown in FIG. 3, it should be understood that the LSP laser unit would similarly operate in association with the same laser guiding system as used for the purpose of carrying out the SLS/SLM process, which laser guiding system is located above the powder bed 15, within the building chamber 30. This being said, in other embodiments of the invention, distinct laser guiding systems could potentially be used for carrying out the SLS/SLM process, on the one hand, and the in-situ LSP process, on the other hand.

In essence, the LSP module 20 can be similar to the LSP module 20 discussed with reference to FIGS. 2a and 2b and is configured to be selectively brought, during the in-situ LSP treatment, in contact with the surface of the powder bed 15 and the desired part located therein. The LSP module 20 may in particular comprise at least a confining window 22 acting as solid confinement medium during the in-situ LSP treatment. While not specifically shown, the LSP module 20 further comprises consumable confining material which is positioned and guided between the confining window 22 and the surface of the powder bed 15, which consumable confining material includes a consumable confining layer transparent to the LSP laser. The consumable confining material may further comprise a consumable ablative layer that is selected to interact with the LSP laser during the in-situ LSP treatment.

In accordance with this first aspect of the invention, the LSP module 20 is configured to be selectively brought into the building chamber 30 for the purpose of carrying out the in-situ LSP treatment and to be temporarily stored, when not used for the purpose of carrying out the in-situ LSP treatment, into a separate storage chamber 35 located adjacent to the building chamber 30. In that regard, FIG. 3 shows by way of illustration the LSP module moved into storage chamber 35, namely when not used for the purpose of carrying out the in-situ LSP treatment.

By way of preference, the storage chamber 35 is more specifically isolated from the building chamber 30 to protect the LSP module 20 temporarily stored therein form process residues. Various means can be contemplated and combined to ensure optimal protection of the LSP module 20. Advantageously, the storage chamber 35 may be isolated from the building chamber by overpressure to prevent entry of process residues into the storage chamber 35. In that regard, reference numeral 350 in FIG. 3 designates an overpressure source designed to generate an overpressure in the storage chamber 35.

Alternatively or additionally, the storage chamber 35 may be isolated from the building chamber 30 by an operable door 300 separating the building chamber 30 from the storage chamber 35, the LSP module 20 being conveyable though a passageway defined by the door 300, thereby achieving total physical separation between the two chambers. In this context, the passageway of the door 300 may be provided with one or more brush elements configured to remove process residues that may be present on the LSP module as the LSP module is being conveyed through the passageway. Similarly, the passageway may additionally or alternatively be provided with one or more nozzle elements configured to subject the LSP module 20 to a gas flow to remove process residues from the LSP module as it is being conveyed through the passageway.

Figure 4:
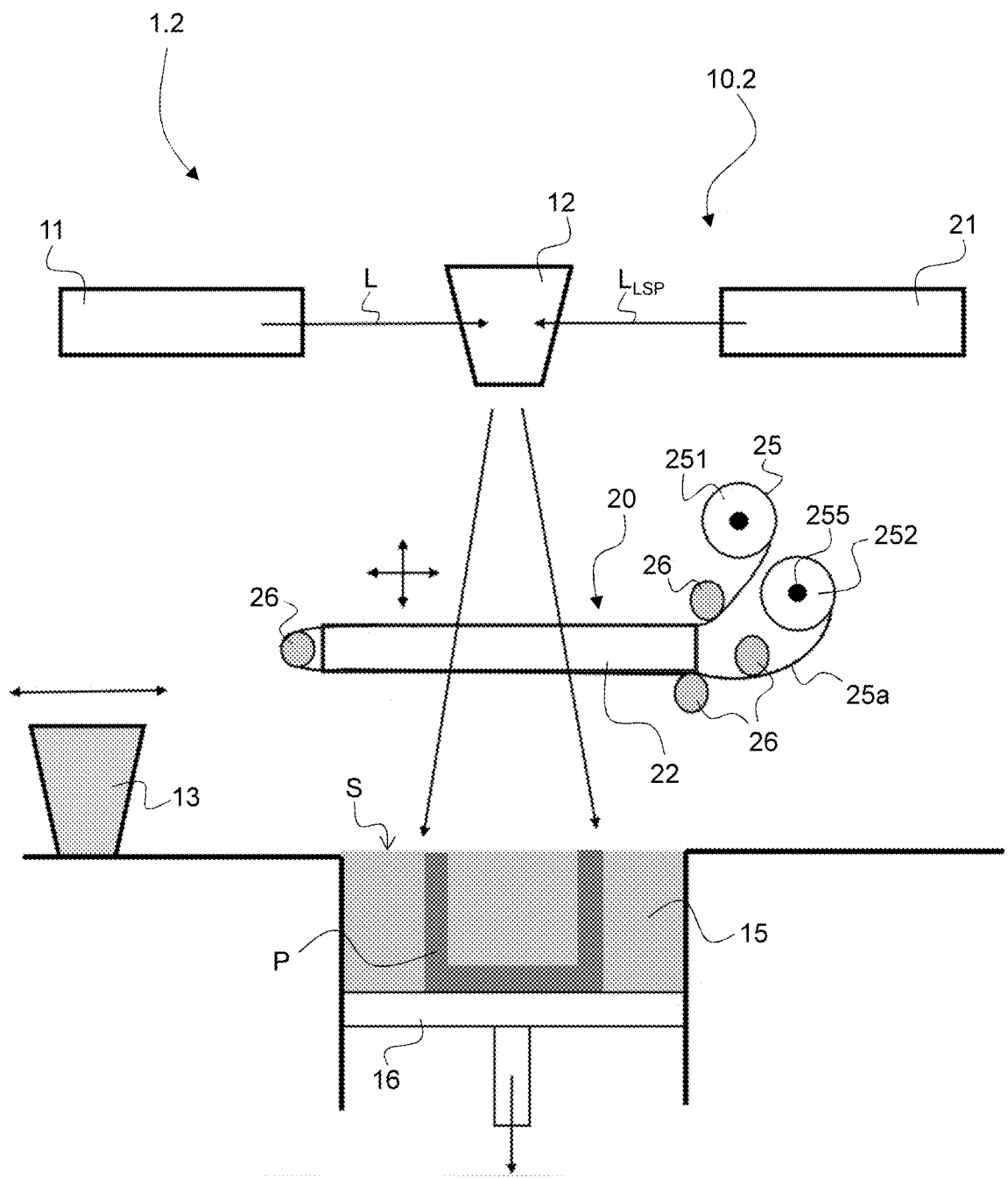
FIG. 4 is a schematic illustration of a second embodiment of a hybrid SLS/SLM system including an in-situ LSP treatment system in accordance with the second aspect of the invention.

FIG. 4 is a schematic illustration of a second embodiment of a hybrid SLS/SLM system, designated globally by reference 1.2, including an in-situ LSP treatment system 10.2 in accordance with the second aspect of the invention. The same reference numerals are used in FIG. 4 with regard to relevant components 11-13, 15, 16 of the SLS/SLM system 1.2 that have previously been described with reference to FIGS. 1 to 3, which components fulfil essentially the same purposes and do not accordingly need to be described again.

The in-situ LSP treatment system 10.2 shown in FIG. 4 is functionally similar to the system 10 described with reference to FIGS. 2a-b and likewise comprises an LSP laser unit 21 and associated LSP module 20 that is operable in conjunction with the LSP laser unit 21. In FIG. 4, the LSP module 20 is shown retracted away from the surface S of the powder bed 15 where the part P is being produced, but it should likewise be understood that the LSP module 20 is configured to be selectively brought, during the in-situ LSP treatment, in contact with the surface S of the powder bed 15, as previously discussed. In that respect, the other embodiments shown in FIGS. 5 and 6 likewise show the LSP module 20 in a retracted position, for the purpose of illustration.

In contrast with the known solution shown in FIGS. 2a and 2b, consumable confining material 25, including the consumable confining layer 25a, is positioned and guided in such a way that the consumable confining layer 25a surrounds the confining window 22, on top and bottom surfaces thereof, thereby protecting the confining window 22 on both sides from contamination by process residues. To this end, as shown in the illustrative example of FIG. 4, the consumable confining material 25 is preferably guided around the confining window 22 by means of a plurality of guide rollers 26. In that regard, the supply roll 251 is accordingly repositioned, next to the recovery roll 252. In effect, the consumable confining layer 25a here acts as an encapsulating medium around the confining window 22. In this way, even if process residues happen to end on the top surface of the LSP module 20, those process residues will be removed upon winding the consumable confining material 25 on the recovery roll 252.

Figure 5:
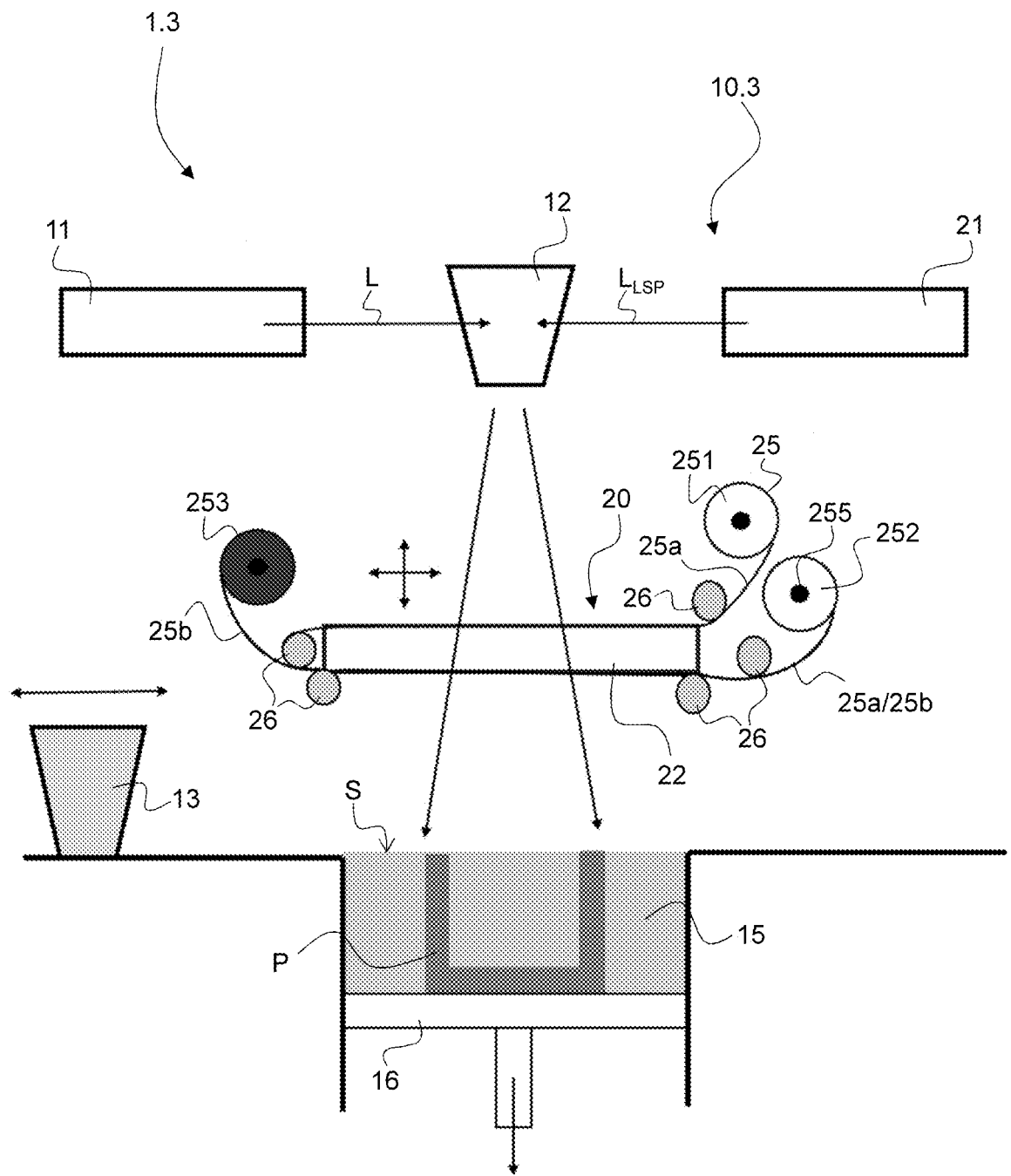
FIG. 5 is a schematic illustration of a third embodiment of a hybrid SLS/SLM system including an in-situ LSP treatment system in accordance with the second aspect of the invention.

FIG. 5 is a schematic illustration of a third embodiment of a hybrid SLS/SLM system, designated globally by reference 1.3, including an in-situ LSP treatment system 10.3 in accordance with the second aspect of the invention, which third embodiment is illustrative of a variant of the second embodiment discussed above.

In accordance with this third embodiment, the LSP module 20 further includes consumable ablative material 25b, here separate from the consumable confining material 25, which is positioned and guided between the consumable confining material 25 and the surface S of the powder bed 15. This consumable ablative material 25b includes a consumable ablative layer that is selected to interact with the LSP laser beam $L_{LSP}$ and impart beneficial residual stresses into the desired part P upon being subjected to the action of the LSP laser beam $L_{LSP}$. In effect, the consumable ablative material 25b is not an integral part of the consumable confining material 25 (as discussed e.g. in connection with the known solution shown in FIGS. 2a-b) but is supplied separately and in addition to the consumable confining material 25 which bears the consumable confining layer 25a. The consumable ablative material 25b runs exclusively on the bottom surface of the LSP module 20, namely between the consumable confining layer 25a and the surface S of the powder bed 15 and the desired part P being formed therein, as it would otherwise obstruct the path of the LSP laser beam $L_{LSP}$ through the confining window 22.

The consumable ablative material 25b may advantageously be supplied in the form of rolls. More specifically, a dedicated supply roll 253 may be provided from which fresh ablative material 25b may be unwound. A dedicated recovery roll may likewise be provided to allow used ablative material 25b to be rewound. In the illustrated example, used ablative material 25b is advantageously wound on the same recovery roll 252 as used for recovering the used confining material 25 bearing the used confining layer 25a.

Figure 6:
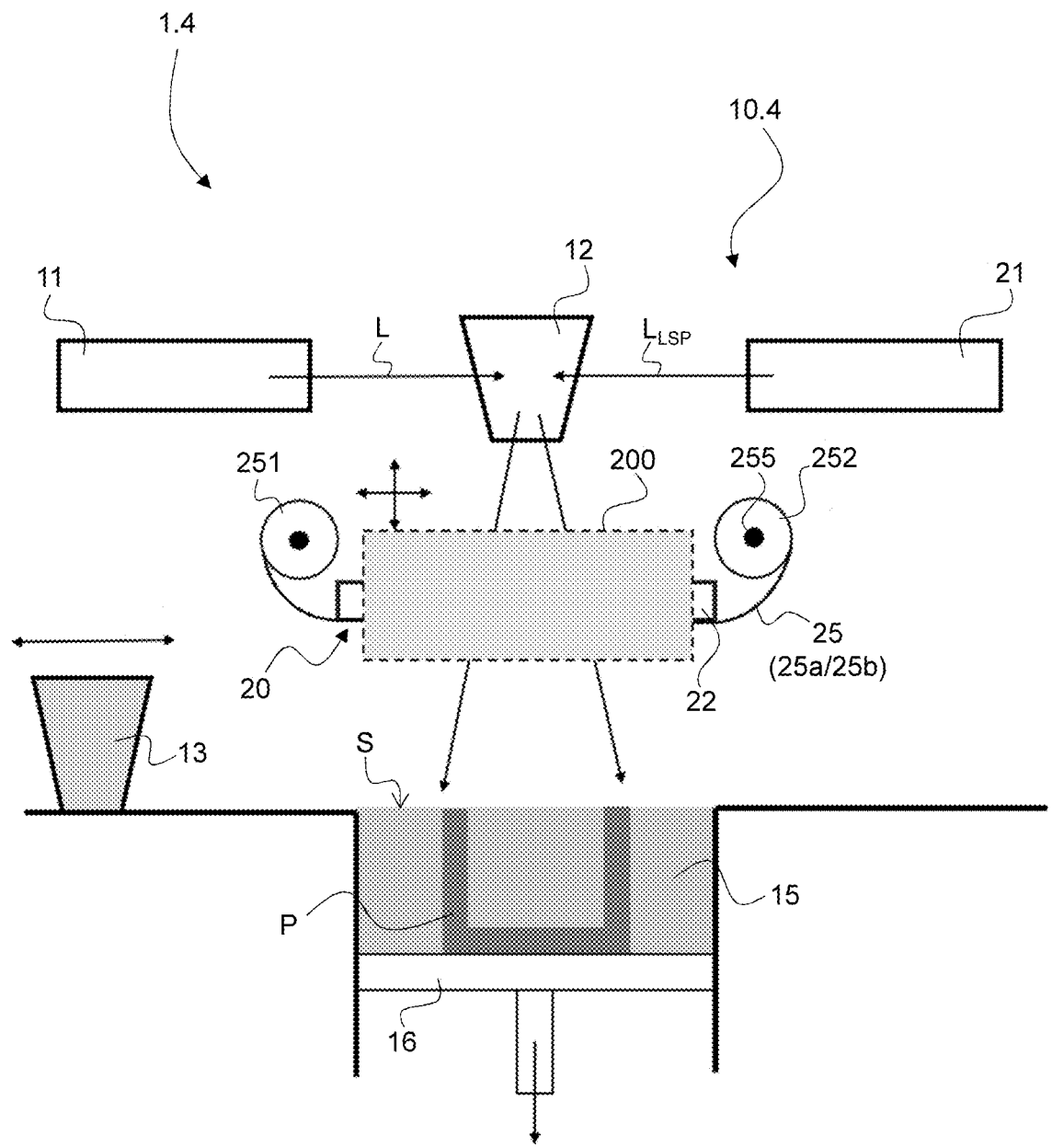
FIG. 6 is a schematic illustration of a fourth embodiment of a hybrid SLS/SLM system including an in-situ LSP treatment system in accordance with the third aspect of the invention.
Figure 7:
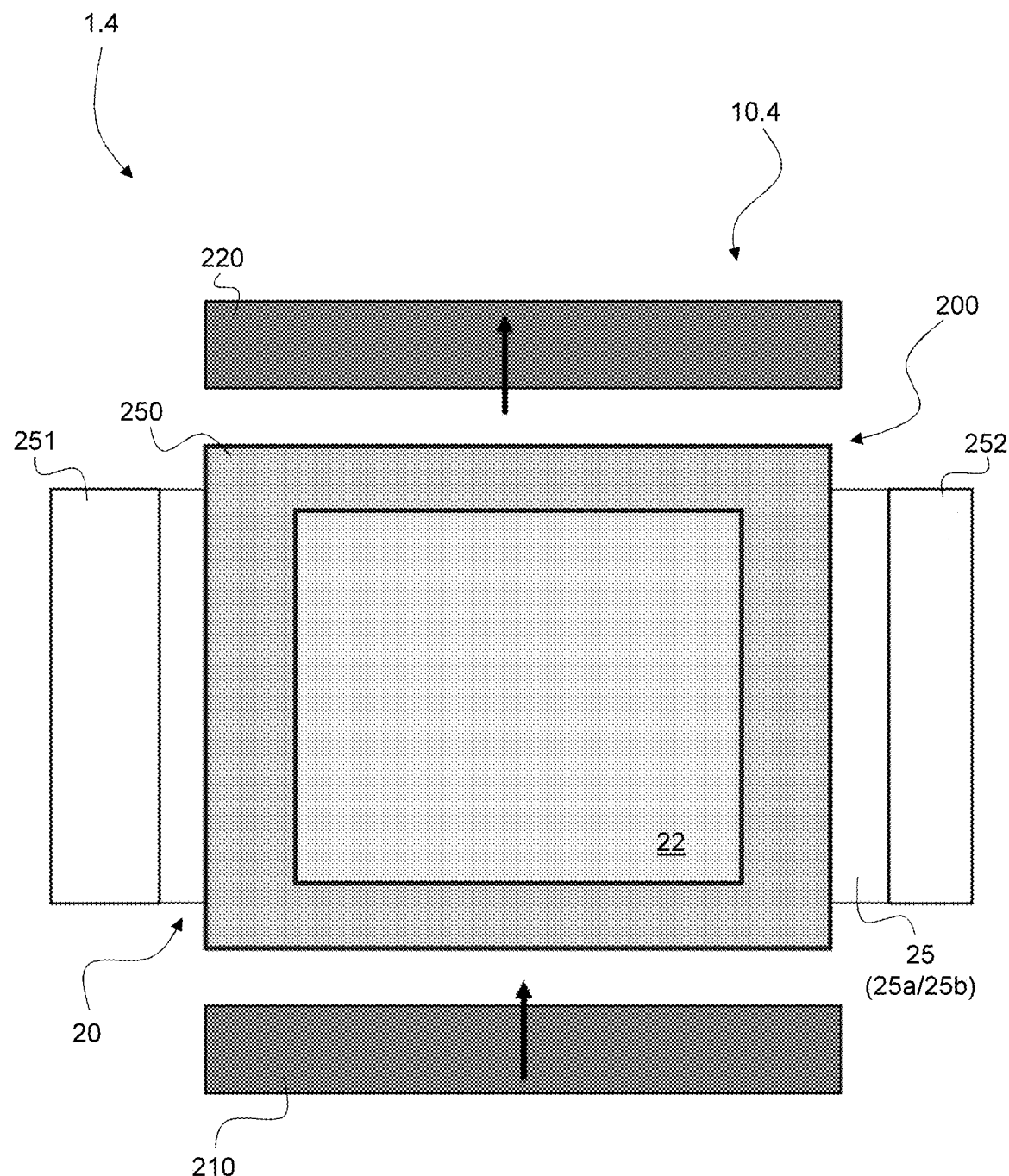
FIG. 7 is a schematic top view of the fourth embodiment of FIG. 6.

FIGS. 6 and 7 are schematic illustrations of a fourth embodiment of a hybrid SLS/SLM system, designated globally by reference 1.4, including an in-situ LSP treatment system 10.4 in accordance with the third aspect of the invention, bearing in mind that the principles thereof are perfectly combinable with the other aspects of the invention discussed herein. The same reference numerals are once again used in FIG. 6 with regard to relevant components 11-13, 15, 16 of the SLS/SLM system 1.4 that have previously been described with reference to FIGS. 1 to 5, which components fulfil essentially the same purposes and do not accordingly need to be described again.

The in-situ LSP treatment system 10.4 shown in FIGS. 6 and 7 is functionally similar to the previously described in-situ LSP treatment systems and likewise comprises an LSP laser unit 21 and associated LSP module 20 that is operable in conjunction with the LSP laser unit 21 to carry out the in-situ LSP treatment of the desired part P. In effect, the LSP module 20 shown in FIG. 6 exhibits a similar structure as the one discussed with reference to FIGS. 2a and 2b (and FIGS. 3 to 5). FIG. 6 schematically shows a protective gas flow arrangement, designated by reference numeral 200, that is designed to produce a stream of gas within which the LSP module 20 is at least partially located, when not used for the purpose of carrying out the in-situ LSP treatment. In the illustrated example, at least part (preferably all) of the confining window 22 is located within the stream of gas, as well as the relevant portion of the consumable confining material 25 that runs along the bottom surface of the confining window 22. The stream of gas is helpful in that process residues that may happen to deposit on the LSP module 20 will be blown away.

The protective gas flow arrangement 200 can be designed to operate in an essentially closed loop or, alternatively, in an open loop. A closed loop arrangement is particularly advantageous in the event that an inert gas, such as nitrogen or—especially—argon, is adopted, as consumption of the inert gas and/or release thereof in the environment should be kept under control and/or restricted. A closed loop arrangement may additionally be provided with a suitable filtration system to ensure that process residues are not being sucked in and reemitted.

The protective gas flow arrangement 200 may be stationary with respect to the LSP module 20, meaning that the LSP module 20 is selectively moved out of the stream of gas, when used for the purpose of carrying out the in-situ LSP treatment, and into the stream of gas, when not used for the purpose of carrying out the in-situ LSP treatment.

Alternatively, the protective gas flow arrangement 200 could be an integral part of the LSP module 20 and be movable together with the LSP module 20. In this context, it may be desirable (but not necessary) to switch off the stream of gas during the in-situ LSP treatment, when the LSP module 20 is brought in contact with the surface S of the powder bed 15 to prevent any interference between the stream of gas and the powder particles contained in the powder bed 15.

As shown in the schematic top view of FIG. 7, the protective gas flow arrangement 200 is of a closed loop configuration, as mentioned above, and comprises a gas flow outlet 210 and a gas flow inlet 220 between which the stream of gas flows as indicated by the arrows pointing upwards in FIG. 7. The gas flow inlet 220 is preferably provided with a filter to remove process residues from the protective gas flow arrangement 200. In the illustrated example, the whole confining window 22 is located within the stream of gas, reference numeral 250 designating a holder designed to hold the confining window 22.

As already mentioned above, the protective gas flow arrangement 200 could alternatively be designed to operate in an open loop, in which case the gas flow inlet 220 could be omitted.

The third aspect of the invention described with reference to FIGS. 6 and 7 could conveniently be combined with the principles discussed previously with reference to FIGS. 3 to 5, i.e. it should be appreciated that, in other embodiments of the invention, one could contemplate to implement the principles of the third aspect of the invention in combination with the principles of the first or second aspect of the invention.

In accordance with a fourth aspect of the invention, not specifically illustrated, one could also contemplate to make use of a fan and/or mechanical elements, such as brush elements, to remove process residues from the LSP module, especially from the top surface of the confining window.

Figure 8:
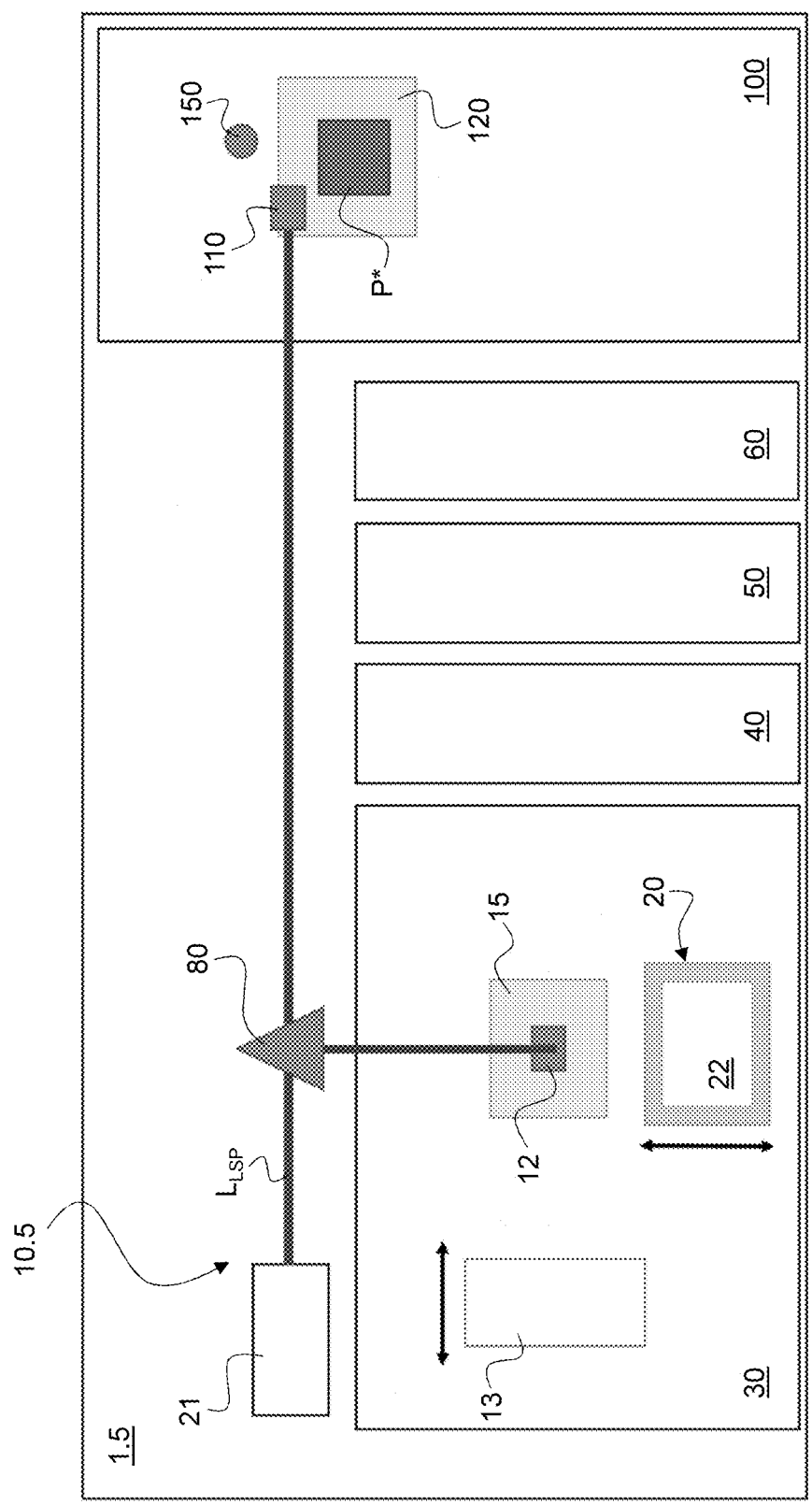
FIG. 8 is a schematic top view of a fifth embodiment of a hybrid SLS/SLM system including an in-situ LSP treatment system as well as a secondary laser treatment system for carrying out an in-line LSP post-process of a produced part in accordance with the fifth aspect of the invention.

FIG. 8 is a schematic top view of a fifth embodiment of a hybrid SLS/SLM system, designated globally by reference 1.5, including an in-situ LSP treatment system 10.5, as well as a secondary laser treatment system, designated by reference numeral 100.

The in-situ LSP treatment system 10.5 may in essence be any suitable laser treatment system, including the known in-situ LSP treatment system 10 of FIGS. 2a and 2b or any one of the previously described in-situ LSP treatment systems 10.1 to 10.4 in accordance with the first to fourth aspects of the invention.

Some components of the SLS/SLM system 1.5 used for the purpose of carrying out layer-by-layer production of the desired part (not shown in FIG. 8) are not specifically illustrated in FIG. 8, but it should once again be appreciated that such components would typically be provided. Shown schematically in FIG. 8 are the laser guiding system 12, the powder deposition system 13, the powder bed 15, the LSP module 20 with its confining window 22, the building chamber 30, and the LSP laser unit 21 producing the LSP laser $L_{LSP}$. The SLS/SLM laser unit used to produce the relevant SLS/SLM laser beam and the platform located below the powder bed 15 are not specifically shown in FIG. 8, but such additional components would typically be provided and would operate in essentially the same manner as previously discussed.

The SLS/SLM system 1.5 depicted in FIG. 8 is able to carry out both an in-situ LSP treatment of the desired part during production thereof by the SLS/SLM process (by means of the in-situ LSP treatment system 10.5)—as previously described—as well as an in-line LSP post-process of a produced part (by means of the secondary laser treatment system 100). In FIG. 8, the produced part is schematically depicted in the secondary laser treatment system 100 by reference sign P* for the sake of distinction. This produced part P* can be a part obtained after completion of the SLS/SLM process or any other part that one wishes to subject to an LSP post-process, including e.g. a part produced by conventional means. In that regard, the same LSP laser unit 21 is used for carrying out both the in-situ LSP treatment and the in-line LSP post-process. To this end, the SLS/SLM system 1.5 is provided with a beam splitter 80 configured to direct the LSP laser beam $L_{LSP}$ to the laser guiding system 12 during the in-situ LSP treatment and/or to the secondary laser treatment system 100 during the in-line LSP post-process.

The SLS/SLM system 1.5 of FIG. 8 further comprises additional modules (or stations) 40, 50, 60 through which the produced part P* is fed following completion of the SLS/SLM process, before reaching the secondary laser treatment system 100. Such modules may in particular comprise a powder removal module 40, a heat treatment module 50, and a module 60 for part detachment/cutting from a baseplate. Although modules 40, 50, 60 add automation to the production process, they are not crucial and can be regarded as advantageous add-ons.

As the secondary laser treatment system 100 makes use of the same LSP laser $L_{LSP}$ as the in-situ LSP treatment system 10.5, overall processing time is significantly decreased. Parts are initially produced in the main building chamber 30 (as previously described). Once the SLS/SLM process is completed, the part P* (still attached e.g. to a baseplate) can be moved through the optional modules 40, 50, 60 for carrying out e.g. powder removal, heat treatment, as well as detachment/cutting from the baseplate, as well as potentially other post-processing steps. Once the part is ready for the LSP post-process, it can be conveyed to the secondary laser treatment system 100.

Schematically shown in FIG. 8 is a part holder 120 to which the part P* may be attached, as well as a suitable laser guiding system 110 configured to direct the LSP laser beam $L_{LSP}$ to selected portions of the part P* that are to be subjected to the in-line LSP post-process. The laser guiding system can for instance be a laser scanning head (in case the part to be treated P* remains stationary during the LSP post-process) or an optical lens system (in case the part to be treated P* is moved during the LSP post-process). Other suitable solutions, known as such from existing LSP post-processing systems, could be contemplated. The laser guiding system 110 can in effect be stationary and the part holder 120 movable so as to adequately position and orient the part P* during the in-line LSP post-process. In that regard, the part holder 120 may be mounted on a robotic arm (not shown) controlled to move the part P* in front of the laser guiding system 110 so as to direct the LSP laser beam $L_{LSP}$ to any desired portions of the part P* to be subjected to the in-situ LSP treatment. Alternatively, the part holder 120 may be stationary and the laser guiding system 110 may be mounted on the robotic arm to adjust and control the direction of the LSP laser beam $L_{LSP}$ relative to the part P* to be post-processed. Exceptionally, both the laser guiding system 110 and the part holder 120 may be mounted on respective robotic arms or other suitable means of motion.

Advantageously, water is used as confining medium for the in-line LSP post-process and a suitable water supply 150 is provided to that end. Exceptionally, the in-line LSP post-process may be carried out using a solid confinement as confining medium.

The LSP laser beam $L_{LSP}$ produced by the LSP laser unit 21 can be used selectively and separately for the purpose of carrying out the in-situ laser treatment of the desired part P, during SLS/SLM production thereof, or for the purpose of carrying out the in-line LSP post-treatment of the produced part P*. In that context, the beam splitter 80 is specifically configured to switch and direct the LSP laser beam $L_{LSP}$ to the laser guiding system 12 or to the laser guiding system 110.

Alternatively, depending on the energy of the LSP laser unit 21 and the relevant energy requirements of the in-situ LSP treatment system 10.5 and of the secondary laser treatment system 100 used for the in-line LSP post-process, the beam splitter 80 could be configured to split the LSP laser beam $L_{LSP}$ to direct part of the energy thereof to the laser guiding system 12 and another part to the laser guiding system 110. The ratio of energies could be adjusted on the run during production using the beam splitter 80.

Various modifications and/or improvements may be made to the above-described embodiments without departing from the scope of the invention as defined by the appended claims. For instance, with regard to the embodiments shown in FIGS. 4 and 5, it should be appreciated that the number and position of the guide rollers 26 are purely illustrative and not meant to be limiting the scope of the invention as claimed. Similarly, the location of the supply and recovery rolls 251, 252, 253 shown in FIGS. 4 to 7 could be modified, and especially be reversed.

LIST OF REFERENCE NUMERALS AND SIGNS USED THEREIN 1 additive manufacturing system (prior art)
1' additive manufacturing system with in-situ LSP treatment system (prior art)
1.1 additive manufacturing system with in-situ LSP treatment system (first embodiment of FIG. 3)
1.2 additive manufacturing system with in-situ LSP treatment system (second embodiment of FIG. 4)
1.3 additive manufacturing system with in-situ LSP treatment system (third embodiment of FIG. 5)
1.4 additive manufacturing system with in-situ LSP treatment system (fourth embodiment of FIGS. 6 and 7)
1.5 additive manufacturing system with in-situ LSP treatment system and secondary laser treatment system for in-line LSP post-processing (fifth embodiment of FIG. 8)
10 in-situ laser treatment system of additive manufacturing system 1' (also referred to as in-situ LSP treatment system or 3D LSP system)
10.1 in-situ laser treatment system of additive manufacturing system 1.1 (also referred to as in-situ LSP treatment system or 3D LSP system)
10.2 in-situ laser treatment system of additive manufacturing system 1.2 (also referred to as in-situ LSP treatment system or 3D LSP system)
10.3 in-situ laser treatment system of additive manufacturing system 1.3 (also referred to as in-situ LSP treatment system or 3D LSP system)
10.4 in-situ laser treatment system of additive manufacturing system 1.4 (also referred to as in-situ LSP treatment system or 3D LSP system)
10.5 in-situ laser treatment system of additive manufacturing system 1.5 (also referred to as in-situ LSP treatment system or 3D LSP system)
11 laser unit for SLS/SLM process (SLS/SLM laser unit)
12 laser guiding system (e.g. scanning head arrangement)
13 powder deposition system
15 powder bed
16 moveable platform
20 LSP module
21 laser unit for LSP treatment (LSP laser unit)
22 confining window
25 consumable confining material (e.g. multi-layered confining material)
25a consumable confining layer
25b consumable ablative material/layer
26 guide rollers
30 building chamber
35 storage chamber
40 add-on module e.g. for powder removal
50 add-on module e.g. for heat treatment
60 add-on module e.g. for detachment/cutting from part baseplate
80 beam splitter
100 secondary laser treatment system for in-line LSP post-processing of produced part P*
110 laser guiding system for LSP laser $L_{LSP}$
120 holding platform for part P*
150 water supply for use as confining medium
200 gas flow arrangement
210 outlet of gas flow arrangement 200
220 inlet of gas flow arrangement 200
250 holder for confining window 22
251 supply roll for (fresh) consumable confining material 25
252 recovery roll for (used) consumable confining material 25 and, optionally, (used) consumable ablative material 25b
253 supply roll for (fresh) consumable ablative material 25b
255 actuator for winding of recovery roll 252
300 operable door separating building chamber from storage chamber
350 overpressure source
L SLS/SLM laser produced by laser unit 11 for carrying out SLS/SLM process (selected to interact with powder particles)
$L_{LSP}$ LSP laser (pulsed laser) produced by laser unit 21 for carrying in-situ LSP treatment and/or in-line LSP post-process (selected to interact with ablative layer of consumable LSP material)
P desired part being gradually produced by the SLS/SLM process
P* produced part subjected to LSP post-process (e.g. part obtained after completion of the SLS/SLM process or part produced by conventional means)
S surface of powder bed 15 and desired part P being gradually produced therein

The invention claimed is:

1. A laser treatment system structured to impart residual stresses into a workpiece during production thereof by a Selective Laser Sintering or Melting (SLS/SLM) process, the laser treatment system comprising:
    a powder bed structured to receive powder particles and in which the workpiece can be progressively produced, layer after layer, in accordance with the SLS/SLM process;
    a first laser unit producing a first laser beam that is selected to carry out an in-situ Laser Shock Peening (LSP) treatment on the workpiece as the workpiece is progressively being produced in the powder bed;
    an LSP module operable in conjunction with the first laser unit to be selectively brought, during the in-situ LSP treatment, in contact with a surface of the powder bed; and
    a laser guiding system operable to guide the first laser beam, during the in-situ LSP treatment, over selected portions of the surface of the powder bed to impart residual stresses into the workpiece upon being subjected to the action of the first laser beam,
    wherein the LSP module includes:
        a confining window transparent to the first laser beam; and
        consumable confining material, distinct from the confining window, which is positioned between the confining window and the surface of the powder bed, the consumable confining material including a consumable confining layer transparent to the first laser beam,
    and wherein the consumable confining material is positioned and guided in such a way that the consumable confining layer surrounds the confining window and runs along top and bottom surfaces of the confining window to protect the confining window from contamination by process residues.

2. The laser treatment system according to claim 1, wherein the LSP module further includes consumable ablative material, separate from the consumable confining material, which is positioned and guided between the consumable confining material and the surface of the powder bed, the consumable ablative material including a consumable ablative layer that is selected to interact with the first laser beam and impart residual stresses into the workpiece upon being subjected to the action of the first laser beam.

3. The laser treatment system according to claim 2, wherein the consumable ablative material is supplied in the form of rolls and wherein the laser treatment system comprises a supply roll from which fresh ablative material is unwound and a recovery roll onto which used ablative material is wound after use.

4. The laser treatment system according to claim 2, wherein the consumable confining material is supplied in the form of rolls, wherein the laser treatment system comprises a first supply roll from which fresh confining material is unwound, a second supply roll from which fresh ablative material is unwound, and a common recovery roll onto which used confining material and used ablative material are is wound after use.

5. The laser treatment system according to claim 1, wherein the LSP module is at least partially locatable within a stream of gas produced by an associated protective gas flow arrangement when not used for the purpose of carrying out the in-situ LSP treatment.

6. The laser treatment system according to claim 5, wherein the stream of gas flows in an essentially closed loop from a gas flow outlet to a gas flow inlet of the protective gas flow arrangement.

7. The laser treatment system according to claim 5, wherein the stream of gas is a stream of inert gas.

8. The laser treatment system according to claim 7, wherein the inert gas is nitrogen or argon.

9. The laser treatment system according to claim 5, wherein the stream of gas flows in an open loop out of a gas flow outlet of the protective gas flow arrangement.

10. The laser treatment system according to claim 5, wherein the protective gas flow arrangement is stationary and wherein the LSP module is movable out of the stream of gas produced by the protective gas flow arrangement, when used for the purpose of carrying out the in-situ LSP treatment, and into the stream of gas produced by the protective gas flow arrangement, when not used for the purpose of carrying out the in-situ LSP treatment.

11. The laser treatment system according to claim 5, wherein the protective gas flow arrangement is an integral part of the LSP module and is movable together with the LSP module.

12. The laser treatment system according to claim 1, wherein the LSP module is at least partially locatable within a stream of gas produced by an associated protective gas flow arrangement when not used for the purpose of carrying out the in-situ LSP treatment,
and wherein the confining window as a whole is locatable within the stream of gas when the LSP module is not used for the purpose of carrying out the in-situ LSP treatment.

13. The laser treatment system according to claim 12, wherein the stream of gas flows in an essentially closed loop from a gas flow outlet to a gas flow inlet of the protective gas flow arrangement.

14. The laser treatment system according to claim 12, wherein the stream of gas is a stream of inert gas.

15. The laser treatment system according to claim 14, wherein the inert gas is nitrogen or argon.

16. The laser treatment system according to claim 12, wherein the stream of gas flows in an open loop out of a gas flow outlet of the protective gas flow arrangement.

17. The laser treatment system according to claim 12, wherein the protective gas flow arrangement is stationary and wherein the LSP module is movable out of the stream of gas produced by the protective gas flow arrangement, when used for the purpose of carrying out the in-situ LSP treatment, and into the stream of gas produced by the protective gas flow arrangement, when not used for the purpose of carrying out the in-situ LSP treatment.

18. The laser treatment system according to claim 12, wherein the protective gas flow arrangement is an integral part of the LSP module and is movable together with the LSP module.

19. The laser treatment system according to claim 1, wherein the consumable confining material is supplied in the form of rolls and wherein the laser treatment system comprises a supply roll from which fresh confining material is unwound and a recovery roll onto which used confining material is wound after use.

20. An additive manufacturing system for production of a workpiece by a Selective Laser Sintering or Melting (SLS/SLM) process, the additive manufacturing system comprising a laser treatment system in accordance with claim 1 acting as in-situ laser treatment system during the SLS/SLM process, the additive manufacturing system further comprising:
a movable platform located below the powder bed and structured to be progressively lowered as the workpiece is being progressively produced in the powder bed;
a second laser unit producing a second laser beam that is selected to interact with the powder particles contained in the powder bed to carry out the SLS/SLM process; and
a powder deposition system operable to deposit a fresh layer of powder particles over the surface of the powder bed prior to treatment with the second laser beam.

21. The additive manufacturing system according to claim 20, wherein the laser guiding system is further operable to guide the second laser beam over selected portions of the surface of the powder bed during the SLS/SLM process to cause local fusing or melting of the powder particles.

22. The additive manufacturing system according to claim 20, further comprising a beam splitter to direct the first laser beam to the laser guiding system during the in-situ LSP treatment and/or to a secondary laser treatment system operable to perform an in-line post-treatment of a produced part, which secondary laser treatment system is operable to subject the produced part to an LSP post-treatment, namely, an in-line LSP post-process.

\* \* \* \* \*